Figure 1:
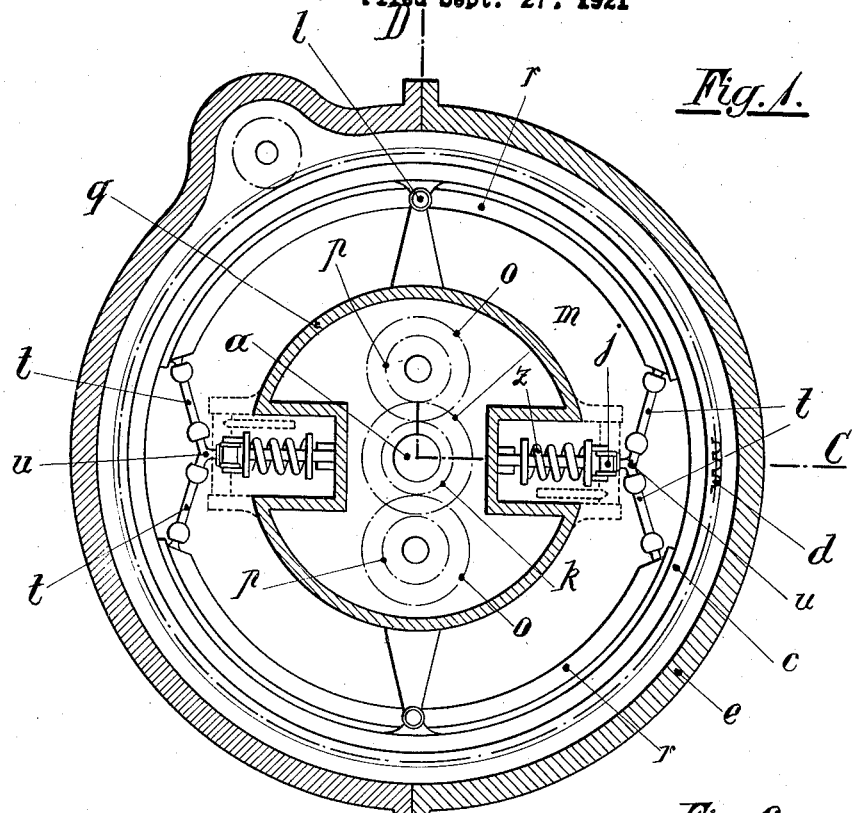

Aug. 19, 1924.

K. MAYBACH

DRIVING GEAR FOR MOTOR CARS

Filed Sept. 27, 1921

1,505,159

INVENTOR:
Karl Maybach

Patented Aug. 19, 1924.

1,505,159

UNITED STATES PATENT OFFICE.

KARL MAYBACH, OF FRIEDRICHSHAFEN, GERMANY, ASSIGNOR TO THE FIRM: MAYBACH MOTORENBAU GESELLSCHAFT MIT BESCHRANKTER HAFTUNG, OF FRIEDRICHSHAFEN, GERMANY.

DRIVING GEAR FOR MOTOR CARS.

Application filed September 27, 1921. Serial No. 503,668.

*To all whom it may concern:*

Be it known that I, KARL MAYBACH, a German citizen, residing at Friedrichshafen a/B., Germany, have invented certain new and useful Improvements in Driving Gears for Motor Cars, of which the following is a specification.

My invention refers to motor cars and other motor driven vehicles and more particularly to the means for transmitting power from the motor to the vehicle. It is an object of my invention to provide a simpler and more reliable transmission gear than those hitherto known.

The present invention allows of placing the Cardan shaft close to the motor or the motor casing respectively, also in such motors as are provided with a simple kind of change speed gear serving only for carrying the car in emergency cases across very bad roads such as soft steeply ascending ground.

The present invention substantially consists in a particular arrangement of the transmission gear, the motor fly wheel and the usual extension of the motor casing, which surrounds the fly wheel, forming part of the change speed gear. In the drawings affixed to this specification and forming part thereof a transmission gear embodying my invention is illustrated diagrammatically by way of example. In the drawings—

Figure 2:
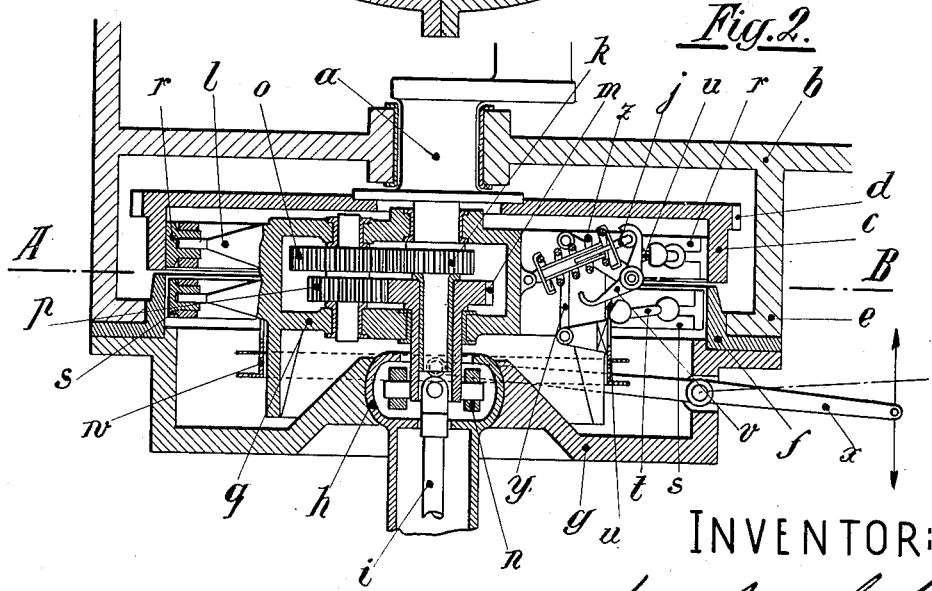

Fig. 1 is a cross section on the line A—B in Fig. 2, and Fig. 2 is an axial section on the line C—D in Fig. 1.

Referring to the drawings, $a$ is the motor shaft, $b$ is part of the motor casing and $c$ is the fly wheel arranged on said shaft outside said casing and provided in a well-known manner with the toothed rim $d$ serving to drive the spur wheel of a suitable starting engine. The fly wheel is surrounded in a well known manner by an annular extension $e$ of the motor casing $b$, this extension being provided near the outer edge of the fly wheel with a rim $f$ about equalling the fly wheel in diameter and provided with an internal cylindrical coupling face.

The cover $g$ serves to close the extension $c$; it supports the Cardan head $h$ of the Cardan tube surrounding the Cardan shaft $i$.

The novel change speed gear whose width in axial direction is extremely small, is housed within the extension $c$. It consists substantially of a spur wheel $k$ fixed to the motor shaft $a$ and of a spur wheel $m$ loose on the shaft and provided with a greater number of teeth. Intermediate the hub of the wheel $m$ and the Cardan shaft $i$ the Cardan joint $n$ is arranged. The change speed gear further comprises pairs of planet wheels $o$ and $p$ coupled with one another, the wheel $o$ meshing with wheel $k$ and wheel $p$ with wheel $m$. The planet wheels are rotatably located in a drum shaped carrier $q$.

The pairs of planet wheels $o$, $p$ are preferably disposed diametrically opposite one another. At diametrically opposite points of the planet wheel carrier $q$ there are linked at $l$ annular segments $r$ and $s$ after the manner of brake blocks. One system of such annular segments $r$ which almost form a closed ring, is apportioned to the cylindrical inner surface of the fly wheel rim $c$, the other system of ring segments $s$ to the cylindrical inner surface of the rim $f$ inserted in the extension $e$ of the casing. The ring segments of each system are connected with one another by toggle joint levers $t$, and between adjoining toggle joint levers of the two systems there is disposed the toggle arm rocking lever $v$ carried by the planet wheel carrier and having each arm linked to a toggle joint.

The coupling by means of the annular segments $r$ and $s$ is effected by aid of powerful springs $z$ which can be made to act on one or the other system in the following manner:

A forked lever $x$ which may be carried by hand or otherwise into either one of the three positions indicated in Fig. 2 is linked in a well known manner to a sliding sleeve $w$ and by aid of rods $y$ to a third arm of lever $v$. Lever $v$ can thus be turned by means of lever $x$ in such manner as to actuate the toggle lever of one system, while releasing the toggle lever of the other system. The drawings show the toggle lever of the ring system $r$ disposed within the fly wheel in operative position, the ring segments being pressed from within against the inner face of the fly wheel $c$, while the ring segments $s$ have released the coupling face of rim $f$.

In rocking the lever *v* the pressure spring *z* whose plates are connected with one another by a telescoping rod, is rocked about the pivot disposed intermediate the two coupling rims and the ring systems. The free end of the telescoping rod carries the roller *j* which runs in contact with the double arm lever *u* until stopped by the bent down ends of the lever.

This device operates as follows:

In the middle or dead centre position of lever *v* and spring *z* both couplings (*r, c* and *s, f*) are thrown out. On lever *x* being moved to the left, spring *z* is caused to pass through the dead centre position and to assume the position illustrated in Fig. 2, thus coupling the planet wheel carrier *q* with the fly wheel *c*, the coupling between the carrier *q* and the stationary rim *f* being thrown out. The planet wheel carrier now follows the movement of the motor shaft *a* together with the planet wheels. With regard to the planet wheel carrier *q*, the whole system of spur wheels is at rest. This position is the one assumed as long as the car is running. It corresponds to direct power transmission from the motor shaft *a* on to the Cardan shaft *i*. No axial pressures can be transmitted outwards, the couplings forming a closed system of forces.

On lever *x* and spring *z* being rocked so as to move into the opposite position, thereby throwing out coupling *r, c* and throwing in coupling *s, f*, the planet wheel carrier *q* is held fast by the rim *f* and the planet wheels *o* and *p* now cooperate with the spur wheels *k* and *m* to transmit the rotary movement of the motor shaft *a* on to the Cardan shaft *i* at reduced speed in accordance with their number of teeth. In this case as well the forces required for the coupling are balanced.

The last mentioned position of parts corresponds to a case where the motor is no more capable of directly propelling the car. As the change speed gear is brought into action only in such cases, its wear is reduced to a minimum and it may be constructed comparatively light and unexpensive as compared with other change speed gears.

In the middle position of lever *x*, where both couplings are thrown out, the Cardan shaft is not connected with the motor shaft.

The drawing shows the extremely narrow design of the novel gear. The distance between the Cardan joint and the fly wheel *c* of the motor scarcely exceeds the width of the coupling rim *f*.

The operation of the new gear is extremely simple, a single lever being actuated which replaces the support coupling and change levers required up till now. One can change over with the greatest ease and a minimum expenditure of power from one speed to another, while the motor and the car are running.

Where one of the usual electric engines is provided and made reversible, it is possible to run the car backwards in the simplest manner.

I wish it to be understood that I do not desire to be limited to the exact details of construction shown and described, for obvious modifications will occur to a person skilled in the art.

I claim:

1. In a motor vehicle in combination, a motor shaft, a fly wheel on said shaft and a Cardan shaft serving to transmit power, a stationary casing, a coupling rim fixed to said casing, a mechanical change speed gear in said casing comprising planet wheels and a planet wheel carrier incapable of axial displacement, duplicate coupling members attached to said carrier, means for applying either one set of members against said fly wheel or the other set against said rim, and means for alternately carrying said applying means into operative position relatively to one or the other set.

2. In a motor vehicle in combination, a motor shaft, a fly wheel on said shaft and a Cardan shaft serving to transmit power, a stationary casing, a coupling rim fixed to said casing, a change speed gear in said casing comprising planet wheels and a planet wheel carrier, two pairs of ring segments linked to said carrier, means for applying either one set of segments against said fly wheel or the other set against said rim and means for alternately carrying said applying means into operative position relatively to one or the other set.

3. In a motor vehicle in combination, a motor shaft, a fly wheel on said shaft and a Cardan shaft serving to transmit power, a stationary casing, a coupling rim fixed to said casing, a change speed gear in said casing comprising planet wheels and a planet wheel carrier, two pairs of ring segments linked to said carrier, toggle joint levers connecting adjoining ends of each pair of ring segments, means for forcing said toggle joints outwards so as to apply either the one pair of ring segments against said fly wheel or the other pair against said rim, and means for alternately actuating the toggle joints of one or the other pair of ring segments.

4. In a motor vehicle in combination, a motor shaft, a fly wheel on said shaft and a Cardan shaft serving to transmit power, a stationary casing, a coupling rim fixed to said casing, a change speed gear in said casing comprising planet wheels and a planet wheel carrier, two pairs of ring segments linked to said carrier, toggle joint levers connecting adjoining ends of each pair of ring segments, means for forcing said toggle joints outwards so as to apply a pair of ring segments against said fly wheel or said rim, respectively, a double armed rock lever connected with the toggle joints of said pairs of segments so as to alternately actuate one and release the other joint and a lever adapted to be operated from outside for rocking said rock lever.

5. In a motor vehicle in combination, a motor shaft, a fly wheel on said shaft and a Cardan shaft serving to transmit power, a stationary casing, a coupling rim fixed to said casing, a change speed gear in said casing comprising planet wheels and a planet wheel carrier, two pairs of ring segments linked to said carrier, toggle joint levers connecting adjoining ends of each pair of ring segments, means for forcing said toggle joints outwards so as to apply a pair of ring segments against said fly wheel or said rim, respectively, a double armed rock lever connected with the toggle joints of said pairs of segments so as to alternately actuate one and release the other joint and a spring loaded lever adapted to be operated from outside for rocking said rock lever.

In testimony whereof I affix my signature.

KARL MAYBACH.